United States Patent [19]
Johnson et al.

[11] Patent Number: 4,642,618
[45] Date of Patent: Feb. 10, 1987

[54] TOOL FAILURE DETECTOR

[75] Inventors: Eric A. Johnson, Vestal; Lynn A. Price, II, Endicott, both of N.Y.

[73] Assignee: IBM Corporation, Armonk, N.Y.

[21] Appl. No.: 757,897

[22] Filed: Jul. 23, 1985

[51] Int. Cl.[4] ............................................. G08B 21/00
[52] U.S. Cl. ..................................... 340/683; 73/660; 340/370.26
[58] Field of Search ................................ 73/104, 660; 340/870.26, 680, 683

[56] References Cited

U.S. PATENT DOCUMENTS

| | | | |
|---|---|---|---|
| 3,728,919 | 4/1973 | Scott | 83/62 |
| 3,793,627 | 2/1974 | Darrel et al. | 340/680 |
| 3,932,836 | 1/1976 | Harrell et al. | |
| 4,001,773 | 1/1977 | Lamel et al. | |
| 4,207,567 | 6/1980 | Juengel et al. | 73/104 X |
| 4,340,326 | 7/1982 | Buonauro et al. | 408/16 |
| 4,420,685 | 12/1983 | Ohtani et al. | 250/222.2 |
| 4,558,311 | 12/1985 | Forsgren et al. | 340/680 |

OTHER PUBLICATIONS

Wray, T. E., "Broken (Missing) Drill Detector"; IBM Technical Disclosure Bulletin; vol. 25, No. 1; Jun. 1982.

Primary Examiner—Jerry W. Myracle
Attorney, Agent, or Firm—Perman & Green

[57] ABSTRACT

A failure detector detects breakage in a machine tool cutting element, such as a drill bit, by use of a accelerometer supported against a workpiece being operated on by the cutting element. Vibrations are induced in the workpiece by the cutting operation, the vibrations having spectral components in the audio frequency range which are characteristic of proper operation of the cutting element, the spectral components changing upon a breakage of the cutting element. A voltage produced by a positioning mechanism of the cutting element identifies the location of the cutting element relative to the workpiece. A bandpass filter separates the spectral components associated with proper operation from spectral components associated with faulty operation. Logic circuitry signals the joint occurrence of the spectral components of proper operation with the position of the cutting element at the site of the workpiece so as to permit the signaling of a cutting tool failure during operation on the workpiece.

14 Claims, 4 Drawing Figures

TOOL FAILURE DETECTOR

BACKGROUND OF THE INVENTION

This invention relates to a system for the detection of failures in the operation of automatic machine tools and, more particularly, to a system for the detection of a broken bit in boring machinery.

Many objects are fabricated today by the use of milling machinery for the shaping of various components of objects to be manufactured. Such milling machinery may be driven automatically by electronic control for mass production of components which are to be assembled to produce a desired end product. The milling machinery may have cutting heads of various shapes, which heads may be driven in different directions to accomplish a desired shaping of a component.

Of particular interest is the use of a boring machine in the manufacture of printed circuit boards for the electronics industry. The machine has a drill bit which is advanced towards a circuit board for cutting a through hole into the board. Frequently, many through holes are formed in a single circuit board, the drill head of the boring machine being automatically positioned relative to the circuit board during a succession of drilling operations. The drill head is precisely positioned at the various sites on the circuit board for precise location of the through holes, and provides for precise movement of the drill bit in a direction normal to the board for accurate formation of the through hole. A failure of the bit to form properly a desired through hole may necessitate rework of the circuit board, or a discarding of the circuit board.

A problem arises in that fatigue or other causes may induce fracture of the drill bit. Such fracture can occur during a drilling operation, and may go unnoticed until after a circuit board is examined for proper construction. The resulting lack of drilled holes can be costly to a manufacturing operation.

Solutions to the foregoing problem have been attempted by the design of broken drill bit detectors of various configurations. Unfortunately, none of these broken drill bit detectors have met with complete success due to inherent inaccuracies in the detection system, or due to circumstances such as excessive drilling dust blocking a sensor such as an optical sensor. Thus, there is a need for a more reliable apparatus for the detection of a failure in a cutting head, particularly the drill bit of a boring machine.

SUMMARY OF THE INVENTION

The foregoing problem is overcome and other advantages are provided by apparatus for the detection of failure in a machine driven tool, particularly a failure in a drill bit. In accordance with the invention, the failure detection apparatus makes use of vibrations which develop within the cutting head and in a workpiece upon which the cutting head is operating. Such vibrations develop by virtue of the moving contact between the cutting head, or drill bit, and the workpiece. In the case of a boring machine operating on a printed circuit board with a relatively thin drill for forming small diameter holes in the circuit board, such vibrations are characterized by a specific tone or spectrum. The frequency band is in the audio frequency range. The tone is specific to the drill bit, and is distinguishable from other sounds which may be developed by other milling machinery operating upon other work pieces.

In the practice of the invention, it is significant that the tone or spectrum changes upon the development of a failure in the drill bit, particularly a breakage in the drill bit. The distinction between the two tones, or two spectra can be detected by the use of a bandpass filter tuned to the desired tone. In the operation of the invention, it is noted that the desired tone does not appear until the drill bit enters a first side of the circuit board at the beginning of the drilling. The tone changes when the drill bit exits the second side of the circuit board upon completion of the drilling.

In view of the change in tone occurring during the drilling process, the detection system of the invention is responsive also to the position of the drill bit so as to identify the tone produced during the interval of time that the bit is actually engaged in the drilling of the hole.

The foregoing operation of the invention is attained by providing a support for the workpiece, the support positioning the workpiece in the operating region of the tool, and also serving as a mounting base upon which a vibration sensor is positioned. The sensor includes an arm which extends over the workpiece and holds a sensing element, such as an accelerometer against the workpiece for receiving the vibrations from the workpiece.

Advancement and retraction of the drill bit from the workpiece is accomplished by a mechanical drive and motor which are operated by electronic circuitry producing a voltage proportional to the displacement of the tool. In the case of a drill bit operating on a printed circuit board, the displacement is along the longitudinal axis of the drill bit, and is in a direction normal to the surface of the circuit board. A window comparator is set to the values of voltage associated with the displacement between opposite surfaces of the circuit board, so as to provide a signal indicating when the drill bit should be drilling a through hole. A bandpass filter and a detector are connected to the vibration sensor for detecting the specific tone associated with a proper drilling operation. Logic circuitry is responsive to the joint occurrence of the vibration detection with the drilling interval provided by the window comparator for operation of an indicator. The indicator is activated to indicate a failure of the cutting tool in the event that the desired tone of vibration is not received when the drill bit should be in position for drilling the through hole.

BRIEF DESCRIPTION OF THE DRAWING

The foregoing aspects and other features of the invention are explained in the following description, taken in connection with the accompanying drawing wherein.

DETAILED DESCRIPTION

Figure 1:
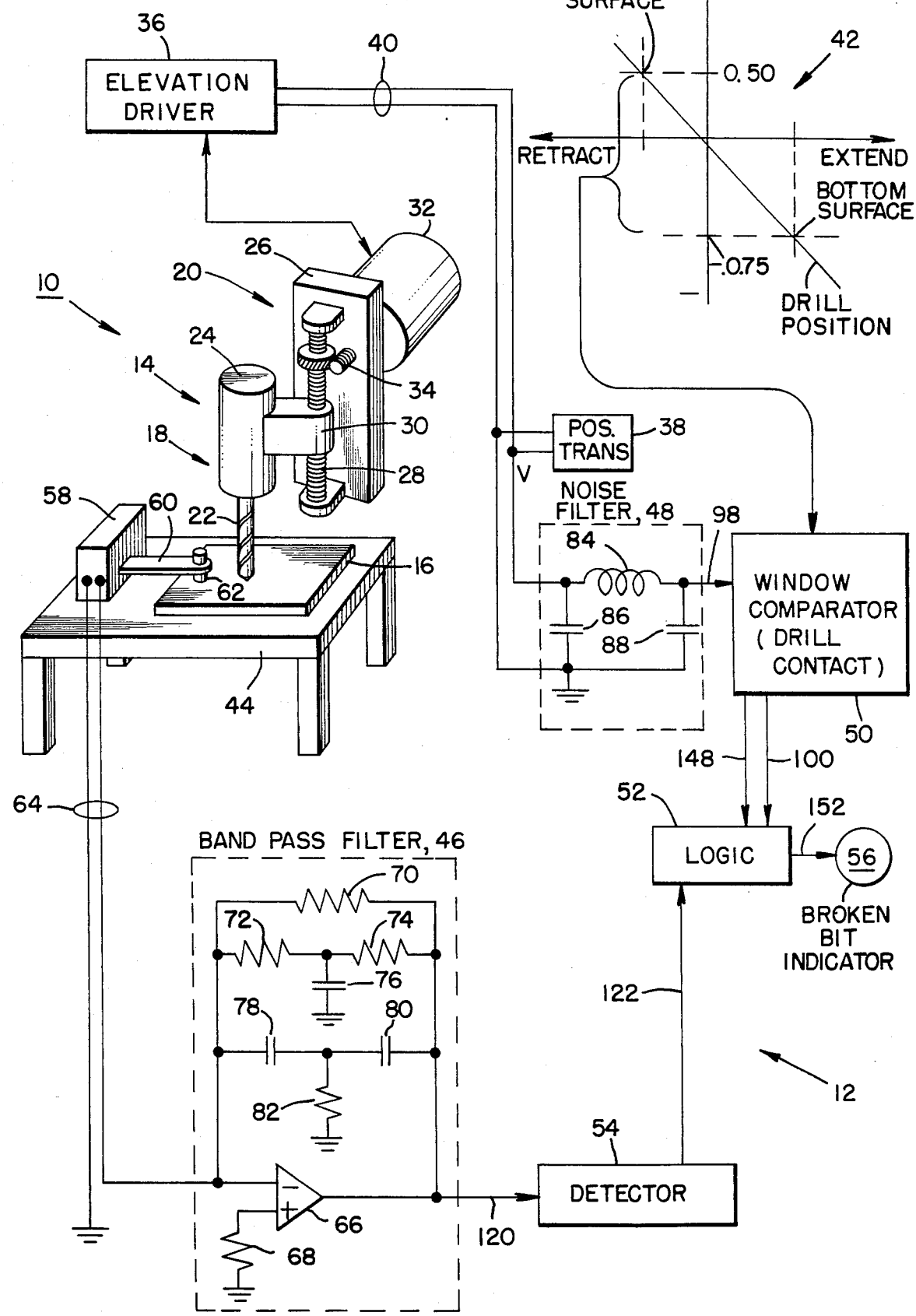
FIG. 1 is a diagrammatic view, partially stylized, of a detection system of the invention in use with a boring machine for drilling holes in a printed circuit board.

With reference to FIG. 1, there is shown a work station 10 including machinery for shaping a workpiece, and a system 12 for detection of a failure in a cutting tool of the machinery. While the system 12 is operable with many forms of machinery having cutting heads for shaping numerous types of workpieces, the invention will be described, by way of example, with reference to the case of drilling through holes in a printed circuit board for the fabrication of electrical equipment. The foregoing machinery is shown as a boring machine 14 and the workpiece is shown as a printed circuit board 16. The boring machine 14 has a drill 18 and an elevation drive assembly 20 for advancing and retracting the drill 18 relative to the circuit board 16 so as to enable the drill 18 to bore a hole in the board 16.

The drill 18 comprises a bit 22 having cutting edges (not shown) thereon for boring a hole in the board 16, and a motor 24 connecting with the bit 22 and applying rotation thereto. The elevation drive assembly 20 comprises a base member 26 supporting a worm gear 28 which engages with a bracket 30 of the motor 24 for raising and lowering the drill 18 upon rotation of the worm gear 28. The elevation drive assembly 20 further comprises a motor 32 which is supported by the base member 26 and coupled to the worm gear 28 via gear set 34 for imparting rotation to the worm gear 28 under control of electric drive signals provided by electric circuitry of an elevation driver 36. The driver 36 comprises a well known motor control circuit (not shown) for rotation of the elevation motor 32 for advancement of the drill 18 towards the circuit board 16 and for retraction of the drill 18 from the circuit board 16.

The desired position of the drill 18 is designated by a position transmitter 38 which provides an analog electric signal on the pair of lines 40 for commanding the drive 35 to activate the motor 32 for advancement or retraction of the drill 18 as is required to bring the bit 22 to a desired position ad designated by the signal in the lines 40. The relationship betwen the position of the cutting edge of the drill bit 22 and the voltage of the signal on the lines 40 is portrayed in a graph 42 located alongside the lines 40. The transmitter 38 may comprise a potentiometer circuit, or other well-known circuit, for outputting the requisite voltage in accordance with a manual input for manual operation of the boring machine 14, or an electronic input for automatic operation of the boring machine 14. The circuit board 16 is supported in front of the drill 18 by a table 44.

In the operation of the boring machine 14, the position transmitter 38 is operated either manually, or automatically in response to electronic signals (not shown) for well-known automated operation of the elevation drive assembly 20, for advancement and retraction of the drill 18 relative to the circuit board 16. While the output signal of the transmitter 38 is shown as an analog voltage, to facilitate demonstration of the invention, it is understood that the transmitter 38 may comprise a well-known digital encoder for the transmission of digital command signals to the circuitry of the elevation driver 36. The drill motor 24 may also be activated manually or automatically by well-known means for rotating the bit 22 at a desired cutting speed during contact of the cutting edges of the bit 22 with the circuit board 16.

In the drilling process, the cutting edges of the drill bit 22 advance from a position above the board 16 to the top surface of the board 16 at which point the drilling of a hole begins. The drilling process continues as the bit 22 advances through the board 16 until the cutting edges exit from the bottom side of the board 16. It is understood that a backer material (not shown) is placed beneath the board 16 for receiving the bit 22.

In the practice of the invention, it is important to note that the foregoing drilling process introduces vibrations into both the drill bit 22 and the circuit board 16. The vibrations arise from the rotary movement of the cutting edges of the bit 22 upon the board 16. Other vibrations also arise from the operation of the elevation motor 32 and the drill motor 24. The total vibration induced in the bit 22 and the board 16 is a combination of both of the foregoing vibrations, and varies in dependence on position of the bit 22 relative to the board 16. Different vibrations are induced in the board 16 in the following four cases, namely, prior to entry of the bit 22 into the board 16, during a cutting of the material of the board 16 by the cutting edges of the bit 22, upon advancement of the cutting edges beyond the bottom side of the board 16, and in the case where the bit 22 breaks.

In the foregoing cases of vibration, the vibration frequencies are in the audio range. The vibrations of the different cases are distinguishable by the spectral frequency components of the vibrations. The spectrum of the vibration during the cutting of the material of the board 16 by the cutting edges of the bit 22 is dependent on the drill 18, and its rotational speed.

The specific characteristics of vibration associated with a properly functioning drill 18 during the drilling of the hole in the board 16 can be determined by a spectral analysis of the vibration. While vibration can be sensed in both the drill 18 and the board 16, the preferred embodiment of the invention makes use of vibrations sensed in the board 16. In the practice of the invention, a spectral analysis of the vibration is performed for the aforementioned four cases so as to establish the significant spectral portion of the vibrations which identifies proper operation of the drill bit 22 during engagement of the cutting edges with the board 16.

The operation of the invention is predicted on the reception of the requisite spectral portion of the vibration spectrum during the drilling of the hole in the board 16. A failure to receive the desired spectral portion of the vibration spectrum during the time interval when the cutting edges should be in contact with the board 16 is understood to be an indication of failure in the drilling process. Such failure may be either a broken bit or a slowing in the rate of rotation of the bit. in either case, a hole will be improperly formed, or not formed at all, within the board 16.

In accordance with a feature of the invention, the failure detection system 12 obtains the requisite vibration data by means of connections to both the boring machine 14 and the circuit board 16. Connection with the boring machine 14 provides data as to the location of the cutting edges of the drill bit 22 while connection to the circuit board 16 provides information as to the vibrations induced therein by the drilling process.

The failure detection system 12 comprises a bandpass filter 46, a noise filter 48, a window comparator 50, a logic unit 52, a detector 54, an indicator 56, and a vibration sensor 58. The vibration sensor 58 is mounted on the table 44, and includes an arm 60 extending out over the circuit board 16 and carrying an accelerometer 62.

The arm 60 positions the accelerometer 62 in contact with the board 16 for sensing vibrations therein. The sensor 58 includes amplifier circuitry (not shown) for amplifying signals received by the accelerometer 62, the sensor 58 outputting amplified accelerometer signals via lines 64 to the bandpass filter 46.

The bandpass filter 46 may employ any one of a number of well known circuits, one suitable circuit being shown in FIG. 1 and comprising an operational amplifier 66 having a positive input terminal grounded by a resistor 68 and a negative input terminal connected by one of the lines 64 to the sensor 58. The other one of the lines 64 is grounded. The filter 46 further comprises three parallel feedback paths connected between an output terminal of the amplifier 66 and the negative input terminal thereof. One of the feedback paths comprises a resistor 70. A second feedback path is formed as a tee section comprising two serially connected resistors 72 and 74 and a capacitor 76 connecting between ground and a junction point of the two resistors 72 and 74. The third feedback path is formed as a tee section comprising two serially connected capacitors 78 and 80 with a resistor 82 connecting between ground and a junction point of the two capacitors 78 and 80.

The capacitor 76 of the second branch tends to decouple the input and output terminals of the capacitor 66 above a breakpoint frequency of the tee section so as to define a lower-frequency edge of a passband of the filter 46. The capacitors 78 and 80 of the third branch tend to decouple the input and output terminals of the amplifier 66 below a breakpoint frequency of the tee section, and thereby establish a higher cut-off frequency of the filter 46. The resistor 74 of the first branch aids in setting the gain of the midband frequencies of the filter 46. The cut-off frequencies are selected to conform with the band edges of the spectrum of frequencies of the vibration produced by a proper cutting of the drill bit 22 in the circuit board 16.

The noise filter 48 includes a series inductor 84, the terminals of which are coupled to two capacitors 86 and 88 in a pi section. The inductor 84 serves to block noise voltage spikes which may be produced on the line 40 by the motor 32 and the driver 36. The capacitors 86 and 88 provide bypass paths for the noise voltage. Thereby, both the inductor 84 and the capacitors 86 and 88 protect the window comparator 50 from any noise on the lines 40. The filter 48 couples the aforementioned analog command signal from the transmitter 38 to the window comparator 50.

In operation, the window comparator 50 outputs a digital signal to the logic unit 52, the digital signal having a logic-1 state (a relatively high voltage) when the voltage on the lines 40 shows a position of the cutting edges of the bit 22 between the top surface and the bottom surface of the board 16. The window comparator 50 outputs a digital signal having a logic-0 state (a relatively low voltage) when the voltage on the lines 40 indicate a position of the cutting edges of the bit 22 away from the board 16. As shown in the graph 42, an example of a printed circuit board 16 is presented in which the voltage command to the elevation driver 36 is at a value of +0.50 volts at the top surface of the board 16, and is at a value of −0.75 volts at the bottom surface of the board 16. The graph 42 depicts a linear relationship betwen the commanded position of the cutting edges and the voltage command signal. An extension of the drill 18 advances the bit 22 downward through the board 16, while a retraction of the drill 18 holds the bit 22 up above the board 16.

The detector 54 detects the presence of a signal in the passband of the filter 46. The detection of such signal indicates the presence of vibration spectral components in the band associated with proper drilling. The logic unit 52 receives the detected signal from the detector 54 as well as the aforementioned digital signal from the comparator 50 to determine that the detector signal is present at the time when the cutting edge of the bit 22 is engaged with the material of the board 16. In the event that the signal of the detector 54 is absent during the interval of time when the cutting edge of the bit 22 is presumed to be in contact with the board 16, the logic unti 52 activates the indicator 56 to show the presence of a broken drill bit. Upon the receipt of the detector signal during the time when the cutting edge of the bit 22 is in contact with the board 16, the indicator 56 remains deactivated.

Figure 2:
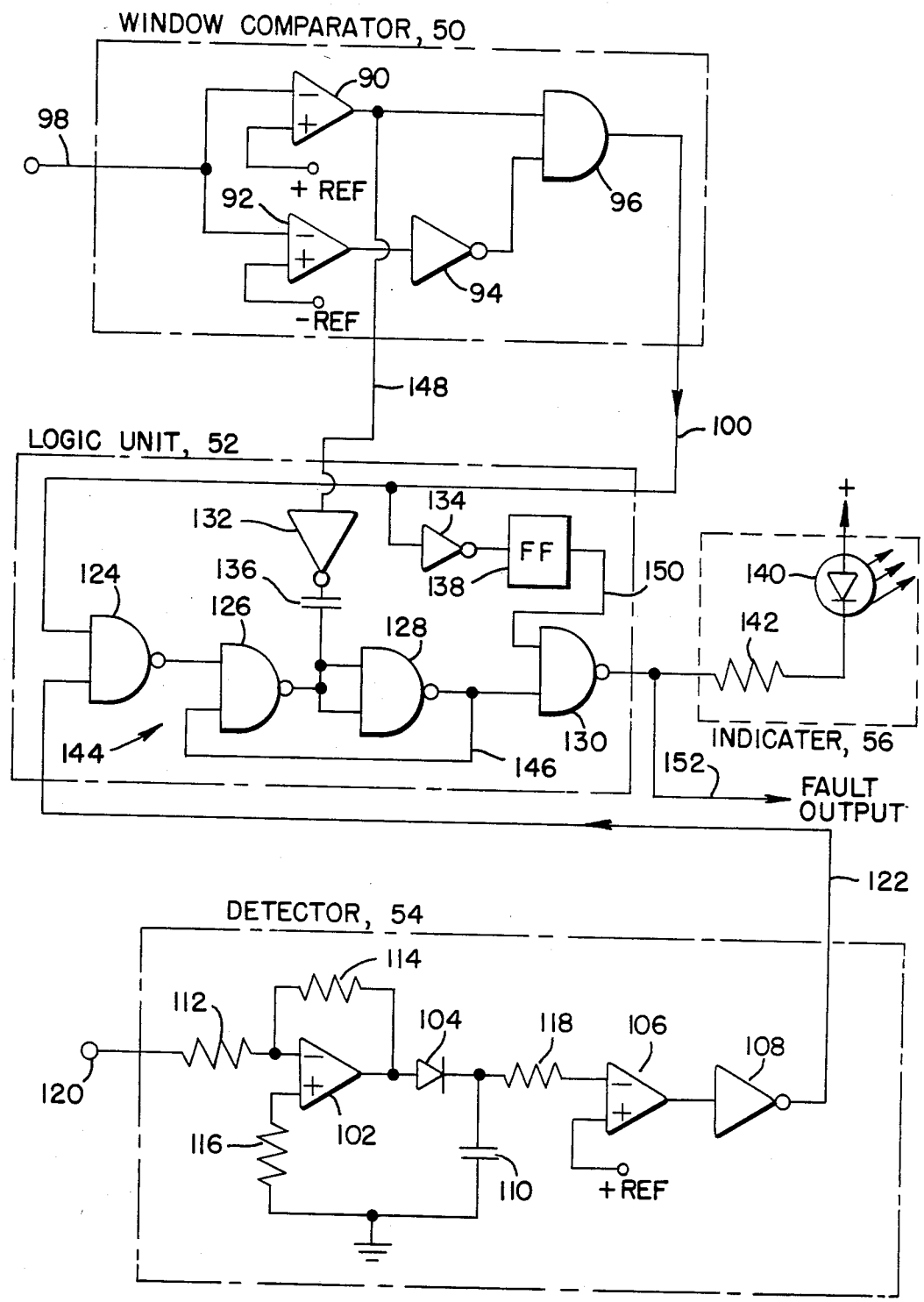
FIG. 2 is an electrical schematic diagram of a window comparator, a logic unit, and a detector of FIG. 1.

With reference also to FIG. 2, the window comparator comprises two comparators 90 and 92, a digital inverter 94, and an AND gate 96. In operation, the window comparator 50 receives an input signal on line 98 from the filter 48, and applies the signal to a negative input terminal in each of the comparators 90 and 92. Positive input terminals of each of the comparators 90 and 92 are connected to sources of reference voltage, the reference voltage applied to the comparator 90 having a value of +0.50 volts, and the reference voltage applied to the comparator 92 having a value of −0.75 volts. These values of reference voltage are the same as those shown in the graph 42 of FIG. 1. When the drill 18 is fully retracted, both of the comparators 90 and 92 output a logic-0 signal, the signal of the comparator 90 being applied directly to an input terminal of the gate 96 while the signal of the comparator 92 is applied via the inverter 94 to a second input terminal of the gate 96. In response to these two signals, the gate 96 outputs a logic-0 signal on line 100 to the logic unit 52.

When the cutting edges of the drill bit 22 advance into the circuit board 16, the output signal of the comparator 92 remains unchanged, but the output signal of the comparator 90 changes to a logic-1. The gate 96 then outputs a logic-1 signal to the logic unit 52. When the cutting surfaces of the bit 22 advance beyond the bottom surface of the board 16, the output signal of the comparator 90 remains unchanged, but the output signal of the comparator 92 changes to a logic-1, which is inverted by the inverter 94 to appear as a logic-0 signal at the gate 96. The gate 96 then outputs a logic-0 signal via line 100 to the logic unit 52.

The detector 54 comprises an operational amplifier 102, a diode 104, a comparator 106, a digital inverter 108, a capacitor 110, and four resistors 112, 114, 116, and 118. In operation, the detector 54 receives an input signal via line 120 from the filter 46. The input signal on line 120 is applied via the resistor 112 to the negative input terminal of the amplifier 102. The positive input terminal of the amplifier 102 is grounded via the resistor 116. The resistor 114 is connected in a feedback path between the output terminal and the negative input terminal of the amplifier 102 and, in combination with the resistor 112 provides a predetermined value of gain to amplification of the input signal on line 120. The output signal of the amplifier 102 is detected by the diode 104 in combination with the capacitor 110. Alternating current representing drilling vibration appears on line 120. The diode 104 rectifies the alternating current appearing on line 120 and at the output of the amplifier 102 to become a DC (direct current) level to which the capacitor 110 charges. The DC voltage at the capacitor 110 is applied via the resistor 118 to a negative input terminal of the comparator 106, the positive input terminal thereof being connected to a source of positive reference voltage. For relatively low values of voltage across the capacitor 110, which voltage is lower than that of the reference voltage, the comparator 106 outputs a logic-1 signal which is inverted by the inverter 108 to a logic-0 signal on line 122. In the event that the voltage across the capacitor 110 rises above that of the reference voltage to the comparator 106, the comparator 106 outputs a logic-0 signal which is inverted by the inverter 108 to appear as a logic-0 signal on line 122.

It is noted that capacitor 110 stores a signal of relatively large voltage when the bandpass filter 46 has received spectral components of the vibration of the circuit board 16 indicating proper operation of the drill bit 22. Therefore, a logic-1 signal is outputted from the detector 54 via line 122 to the logic unit 52 when proper drilling is detected. During the absence of the signal on line 120, the detector 54 outputs a logic-0 signal on line 122 to the logic unit 52.

It is further noted that the comparator 106 provides the detector 54 with the capability of discerning between signals of differing amplitudes. For example, in the event that a vibration signal having the desired spectral characteristics was received on line 120, but with excessively low amplitude, then the detector 54 would still output a logic-0 signal indicating faulty operation. The value of reference voltage applied to the comparator 106 is adjusted to the anticipated signal strength on line 120 for the case of a properly functioning drill bit 22 in FIG. 1.

The logic unit 52 comprises NAND gates 124, 126, 128, and 130 two digital inverters 132, and 134, a capacitor 136 and a single-shot flip flop 138. The indicator 56 comprises a light-emitting diode 140 and a resistor 142. The NAND gates 126 and 128 are connected together to form a latch 144, the output terminal of the gate 126 being coupled to both input terminals of the gate 128, and the output terminal of the gate 128 being connected via a feedback path 146 to an input terminal of the gate 126. The other input terminal of the gate 126 is driven by an output terminal of the gate 124, the latter having two input terminals, one of which connects with the line 100 from the window comparator 50, and the other of which connects with the line 122 from the detector 54. A reset circuit for the latch 144 is provided by a serial connection of the inverter 132 and the capacitor 136, the capacitor 136 connecting with the input terminals of the gate 128 while the input terminal of the inverter 132 is connected via line 148 to the output terminal of the comparator 90. The resetting is accomplished by the presence of a logic-1 signal on line 148, this signal being inverted by the inverter 132 to a logic-0 signal and coupled via the capacitor 136 to the junction of the gates 126 and 128.

In operation, the latch 144, upon being reset, exhibits a logic-1 signal on the feedback path 146. In the presence of logic-1 signals on lines 100 and 122, the gate 124 changes its output state from a logic-1 to a logic-0. This change in state appears at one input terminal of the gate 126 and causes the output terminal to the gate 126 to change from a logic-0 to a logic-1. Thereby, the latch 144 is activated to apply a logic-0 signal from the output terminal of the gate 128 to an input terminal of the gate 130.

Figure 3:
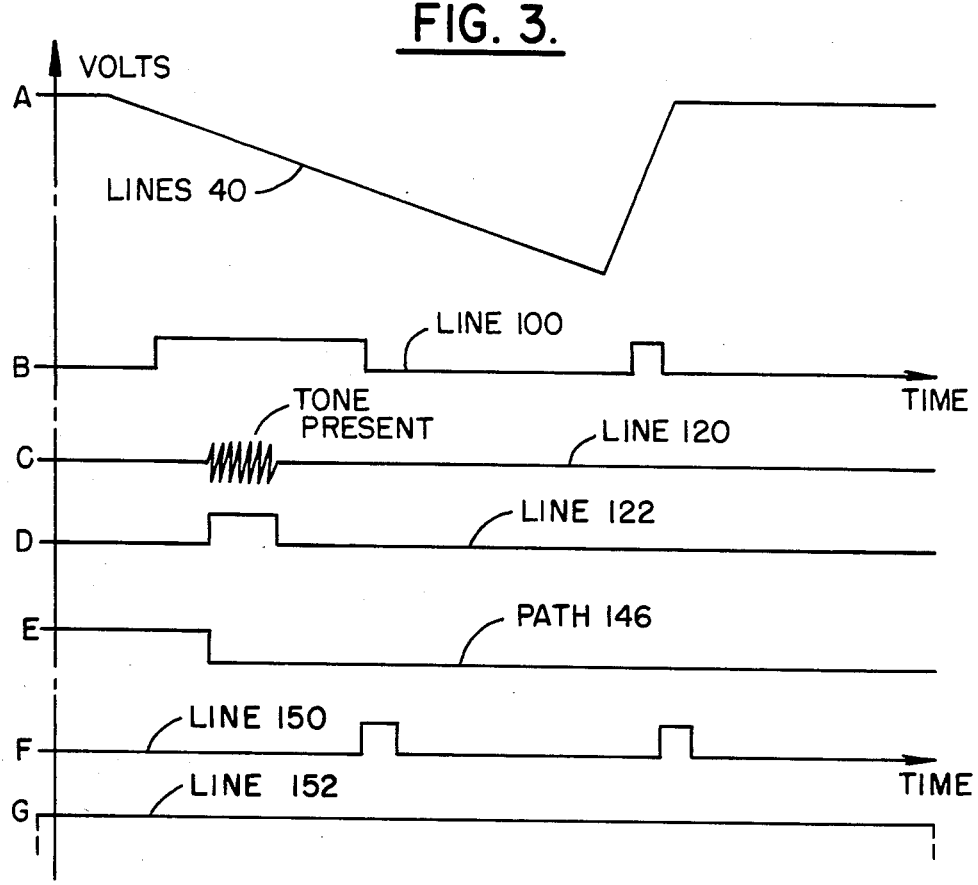
FIG. 3 is a set of timing diagrams useful for explaining the operation of the detection system of FIG. 1 in the situation wherein a vibration sensor of FIG. 1 receives the tone indicating proper operation of the drill bit.
Figure 4:
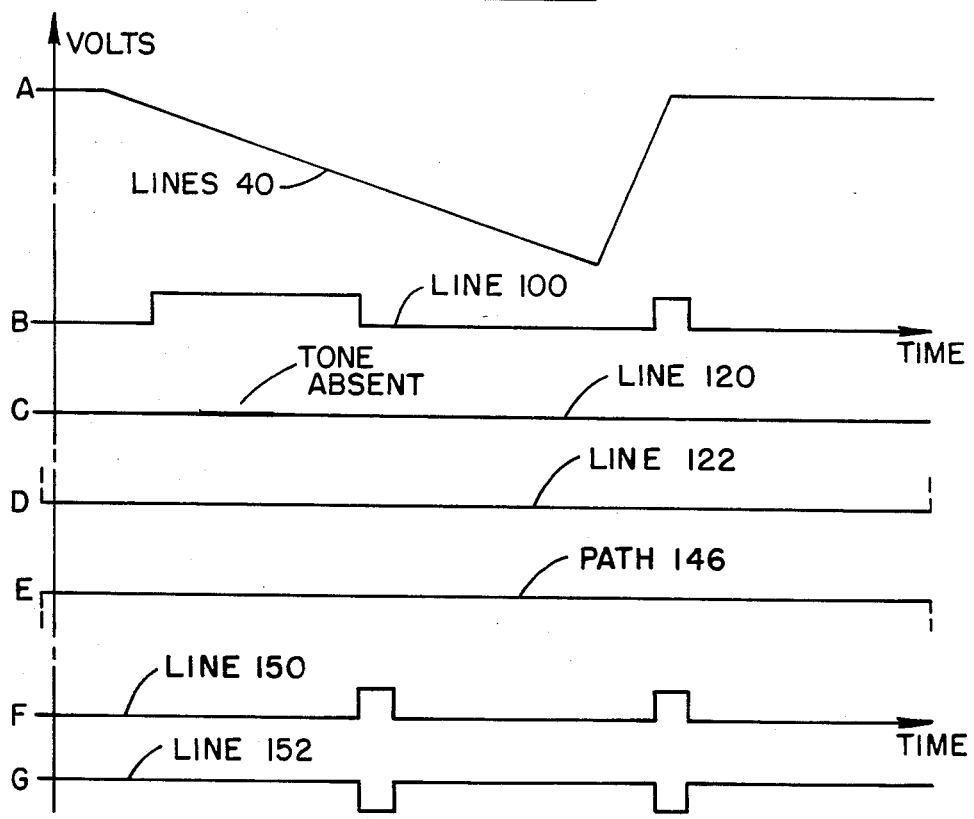
FIG. 4 is a set of timing diagrams useful in explaining the operation of the detection system of FIG. 1 for the situation wherein there is a drill-bit failure and resulting loss of the desired tone.

With reference also to FIGS. 3 and 4, there are shown timing diagrams depicting, respectively, favorable and unfavorable operation of the drill 18. A cycle of the voltage command signal between the lines 40 is shown in graph A in each of the FIGS. 3 and 4. Graph A shows a relatively long negative ramp as the drill 18 is slowly extended, this being followed by a relatively short positive ramp as the drill 18 is rapidly retracted. Graph B, in each of the FIGS. 3 and 4, shows the output of the window comparator 50 on line 100 in response to advancement and retraction of the drill 18 as described above for graph A. Graph B shows a logic-0 signal that is changed to a logic-1 signal as the voltage between the lines 40 passes through the window of the comparator 50. The magnitude of the voltage continues to change, as indicated by the ramp in graph A, and eventually the voltage falls outside of the window in which case the comparator output on line 100 reverts to a logic-0. The negative peak in the ramp voltage of graph A occurs as a fully extended position of the drill 18. During the retrace of the graph A, when the drill 18 is being retracted, the voltage across the lines 40 again passes momentarily through the window of the comparator 50, during which short interval of time the comparator 50 outputs a logic-1 pulse as is portrayed in graph B.

Graph C portrays the signal on line 120. In FIG. 3, the tone associated with a proper drilling process is present on line 120 while, in FIG. 4, the tone is absent on line 120. Graph D shows the corresponding output pulse signal of the detector 54 on line 122, there being an output pulse in FIG. 3 corresponding to the presence of the tone, the output pulse being absent in FIG. 4 in correspondence with the absence of the tone.

Graph E shows the signal on the feedback path 146 in the latch 144. This signal is outputted by the gate 128 and is applied also to an input terminal of the gate 130. In FIG. 3, the joint presence of the logic-1 pulses on lines 100 and 122 introduce a change in state of the signal on the feedback path 146 from a logic-1 to a logic-0. In FIG. 4, wherein the pulse signal on line 122 is absent, the logic state of the feedback path 146 remains unchanged at a value of logic-1.

As shown in FIG. 2, the output signal of the window comparator 50 on line 100 is also coupled via the inverter 134 to strobe the flip flop 138. With reference to graph B in FIGS. 3 and 4, it may be seen that the output signal of the inverter 134 assumes a logic state of 1 (goes high) when the comparator output signal on line 100 reverts (goes low) to the logic-0 state. The flip flop 138 is strobed by the logic-1 signal at the conclusion of each of the pulses shown in graph B of FIGS. 3 and 4. When the drill 18 is being extended, the flip flop 138 is triggered immediately after the bit 22 exits the bottom side of the circuit board 16. Also, during the retraction of the drill 18, the flip flop 138 is triggered when the bit 22 leaves the circuit board 16. The flip flop 138 produces a pulse of predetermined width in response to the triggering by the inverter 134, the output pulse of the flip flop 138 being applied via line 150 to an input terminal of the gate 130. Graph F in FIGS. 3 and 4 shows the flip flop output signal on line 150. As shown in graph F, the flip flop provides an output logic-1 pulse immediately after each of the pulses shown in graph B.

The gate 130 in the logic unit 52 provides an output signal of the logic unit 52 on line 152 to the indicator 56, as well as to a fault output terminal to provide a signal useful in the operation of automatic drilling equipment. Such signal would stop automatic equipment upon the detection of a broken drill bit. The use of an electronic signal to halt automatic equipment is well known and, accordingly, the connection of the fault output terminal to automatic control circuitry for the boring machine 14 is not shown in the drawing. Graph G in FIGS. 3 and 4 shows the output signal of the logic unit 52 on line 152. The NAND gate 130 provides a logic-0 signal on line 152 when the input signals to the gate 130 on lines 150 and 146 are both at logic-1. The logic-0 state on line 152 indicates a fault in the operation of the drill bit 22. As shown in FIGS. 3 and 4, at graphs E and F, the signals on lines 150 and 146 are simultaneously high in FIG. 4 during the output pulse of the flip flop 138 on line 150. A corresponding logic-0 pulse appears on line 152 for each occurrence of the flip-flop pulse on line 150 during a failure of the drilling process.

However, during proper operation of the drill bit 22, as shown in graph E of FIG. 3, the voltage on the feedback path 146 goes low before the occurrence of a logic-1 pulse from the flip flop on line 150. Therefore, the gate 130 is not activated to produce the logic-0 pulses, and the signal on line 152 remains high to designate proper operation of the drill bit 22.

In the indicator 56, the light emitting diode 140 and the resistor 142 are serially connected between a source of positive voltage and the output terminal of the gate 130. During the presence of a failure, the logic-0 pulse on line 152 provides sufficient voltage drop across the serial combination of the diode 140 and the resistor 142 to induce current flow through the diode 140 which then emits light. With each logic-0 pulse on line 152, the diode 140 of the indicator 56 provides a light flash to alert an operator of the boring machine 14.

In view of the foregoing description, it is apparent that the failure detection system of the invention is able to extract drill position data and vibration spectral data to determine whether a drill or other cutting tool is operating properly. The determination is made by analysis of the vibration spectrum, and also by comparing the time of occurrence of the spectral data with the position of the drill bit. There results an output fault indication signal which activates an indicator for visual warning of a fault, as well as for use in automatic shutdown of machinery upon detection of a faulty drilling process.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

We claim:

1. A tool failure detection system for use with machinery comprising a tool ; means for supporting a workpiece in an operating region of said tool; and means for advancing said tool toward said workpiece for operating thereon and for providing a signal indicating position of the tool, an operation of said tool upon the workpiece inducing vibrations characteristic of said operation; said means for sensing said vibrations; means coupled to said sensing means for analyzing said vibrations to determine proper operation of said tool, said analyzing means including means responsive to the position signal for designating when the tool is to be engaged with the workpiece; and means coupled to said analyzing means for indicating a failure in the operation of said tool.

2. A failure detection system according to claim 1 wherein said vibrations are induced in the workpiece, said sensing means being positioned by said supporting means relative to said workpiece for receiving said vibrations.

3. A failure detection system according to claim 2 wherein said sensing means comprises an accelerometer.

4. A failure detection system according to claim 1 wherein said analyzing means is responsive to a frequency of said vibration.

5. A failure detection system according to claim 4 wherein said vibration has spectral components, some of said spectral components arising during proper operation of said tool and other spectral components arising during a failure of said operation; and wherein said analyzing means includes filter means admitting spectral components associated with proper operation while excluding spectral components associated with faulty operation of said tool, said filter means providing a frequency signal indicative of the presence of the spectral components associated with the proper operation of said tool.

6. A failure detection system according to claim 1 wherein:

said tool is a drill and said workpiece is a printed circuit board;

said vibrations are induced in the workpiece, said sensing means being positioned by said supporting means relative to said workpiece for receiving said vibrations;

said sensing means comprises a microphone; and said analyzing means is responsive to a frequency of said vibration.

7. A tool failure detection system for use with machinery comprising a tool; means for supporting a workpiece in an operating region of said tool; and means for advancing said tool towards said workpiece for operating thereon, an operation of said tool upon the workpiece inducing vibrations characteristic of said operation; said failure detection system comprising:

means for sensing said vibrations;

means coupled to said sensing means for analyzing said vibrations to determine proper operation of said tool;

means coupled to said analyzing means for indicating a failure in the operation of said tool; and wherein said analyzing means is responsive to a time of occurrence of said vibrations;

said advancing means provides a position signal indicative of tool position during an advancement of said tool toward said workpiece; and wherein said analyzing means includes a window comparator means responsive to said position signal for designating an interval of time when said tool is to be engaged with the workpiece, said comparator means providing a time signal indicative of an interval of time when said tool is to be engaged with the workpiece.

8. A failure detection system according to claim 7 wherein said analyzing means is responsive to a frequency of said vibration.

9. A failure detection system according to claim 8 wherein said vibration has spectral components, some of said spectral components arising during proper operation of said tool and other spectral components arising during a failure of said operation; and wherein said analyzing means includes filter means admitting spectral components associated with proper operation while excluding spectral components associated with faulty operation of said tool, said filter means providing a frequency signal indicative of the presence of the spectral components associated with the proper operation of said tool.

10. A failure detection system according to claim 9 wherein said analyzing means further comprises logic means responsive to a joint occurrence of said frequency signal and said time signal for activating said indicating means when said frequency signal is absent during an occurrence of said time signal.

11. A failure detection system according to claim 10 wherein said tool is a drill, said workpiece is a printed circuit board, and said filter means comprises a bandpass filter.

12. A failure detection system according to claim 11 wherein said vibrations are induced in the workpiece, said sensing means being positioned by said supporting means relative to said workpiece for receiving said vibrations.

13. A failure detection system according to claim 12 wherein said sensing means comprises an accelerometer.

14. A tool failure detection system for use with machinery comprising a tool; means for supporting a workpiece in an operating region of said tool; and means for advancing said tool towards said workpiece for operating thereon, an operation of said tool upon the workpiece including vibrations characteristic of said operation; said failure detection system comprising:

means for sensing said vibrations;

means coupled to said sensing means for analyzing said vibrations to determine proper operation of said tool;

means coupled to said analyzing means for indicating a failure in the operation of said tool; and wherein said tool is a drill and said workpiece is a printed circuit board;

said vibrations are induced in the workpiece, said sensing means being positioned by said supporting means relative to said workpiece for receiving said vibrations;

said sensing means comprises a microphone;

said analyzing means is responsive to a frequency of said vibration;

said analyzing means is responsive to a time of occurrence of said vibrations;

said advancing means provides a position signal indicative of tool position during an advancement of said tool toward said workpiece; and wherein said analyzing means includes a window comparator means responsive to said position signal for designating an interval of time when said tool is to be engaged with the workpiece, said comparator means providing a time signal indicative of an interval of time when said tool is to be engaged with the workpiece.

* * * * *